United States Patent
Comin-DuMong et al.

[11] Patent Number: 5,857,711
[45] Date of Patent: Jan. 12, 1999

[54] HOSE SLEEVE

[76] Inventors: Shella Comin-DuMong, 1403 S. Jameson La., Santa Barbara, Calif. 93108; Michael G. Petit, 841 Weldon Rd., Santa Barbara, Calif. 93109

[21] Appl. No.: 900,238

[22] Filed: Jul. 24, 1997

[51] Int. Cl.$^6$ .............. B25B 13/06; F16L 35/00
[52] U.S. Cl. .............. 285/38; 285/115; 285/39; 81/121.1
[58] Field of Search ............... 285/38, 39, 114, 285/115; 81/121.1, 124.3

[56] References Cited

U.S. PATENT DOCUMENTS

| | | | |
|---|---|---|---|
| 2,295,830 | 9/1942 | Carlson | 138/61 |
| 4,058,031 | 11/1977 | Magarian | 285/38 |
| 4,805,933 | 2/1989 | Swisher | 285/38 |
| 5,042,845 | 8/1991 | Laboe | 285/38 |
| 5,067,750 | 11/1991 | Minneman | 285/38 |
| 5,297,458 | 3/1994 | Smith et al. | 81/124.2 |
| 5,316,348 | 5/1994 | Franklin | 285/39 |
| 5,367,925 | 11/1994 | Gasparre | 81/121.1 |

FOREIGN PATENT DOCUMENTS

| | | | |
|---|---|---|---|
| 4142334 | 6/1993 | Germany | 285/38 |

Primary Examiner—Eric K. Nicholson
Attorney, Agent, or Firm—Michael G. Petit

[57] ABSTRACT

A device configured to form a sleeve having a proximal end, a distal end and an elongate body portion having an axial lumen therebetween. The body portion is dimensioned to accommodate a length of hose within its axial lumen. The proximal end of the device has a wrench portion adapted to matingly engage at least a portion of the outer surface of a female threaded coupling fixture mounted on a terminal end of the hose. The distal end of the device may or may not be flared outwardly to prevent the hose from kinking when the female coupling fixture mounted on the hose is attached to a supply source such as a water tap. The body portion and distal end of the device is adapted to rotate freely about a length of hose housed therewithin. In one embodiment, the proximal end of the device has a stop operable for preventing the device from sliding away from the female coupling fixture mounted on the hose. The body portion of the device is adapted to prevent the length of hose housed therewithin from kinking along its length. Between the device's proximal end, which in operation overlies at least a portion of the female coupling fixture, and its distal end, the device provides grasping means operable for applying torque to the female coupling fixture enabling a person to comfortably and easily rotate the rotatable female coupling fixture on the hose to facilitate threaded attachment to or removal from a mating fixture or supply source.

13 Claims, 3 Drawing Sheets

HOSE SLEEVE

BACKGROUND OF THE INVENTION

1. Field of the Invention

This invention relates to hoses, such as those commonly used to supply water to gardens, and, more particularly, to a reinforcement sleeve and wrench device for attaching a hose to a water tap. The device, in operation, provides anti-kinking support for a hose as well as providing means for a user to grasp and twist a hose connector for attachment to or removal from a supply source, spigot or mating fixture.

2. Prior Art

Reinforcing devices for use with a water hose are well known in the art. Some examples for such devices are provided in U.S. Pat. Nos. 5,316,348, 5,246,254, and 5,333,650. In addition, various mail-order catalogs offer such anti-kinking devices either preattached to a hose or sold separately as a hose attachment. In the latter instance, the devices are designed to slide onto a hose.

Particular attention is drawn to U.S. Pat. No. 5,316,348 to Franklin et al. (the '348 device). The '438 device comprises a sleeve having a cylindrical central bore dimensioned to slide over a garden hose. The leading (proximal) end of the sleeve is formed into a wrench which matingly engages the outer surface of the threaded coupling fixture rotatably mounted at the supply terminus of the garden hose. The outer surface of the sleeve includes struts along the length thereof which provide a non-slip surface for grasping the sleeve with the hand which facilitates twisting the device to apply torque to the hose coupling fixture and for strengthening the terminal end of the hose to prevent kinking at or near the water supply fixture. A difficulty arises when using this device as the design requires that the device be slid over the delivery end of the hose and advanced along the length of the hose to the water supply terminus to a position adjacent to the supply end where it is adapted to be used. Further, the device, once in position, is free to slide away from the spigot and along the hose, thereby losing its ability to reduce kinking at the portion of the hose adjacent to the supply coupling fixture.

Notwithstanding the plethora of devices provided for preventing kinking in the supply end of a garden hose, there remains a need for a device which can be simply fitted onto the supply end of a hose without the need for threading the device over the delivery end and sliding the device over the entire length of the hose to overlie the supply end where it is necessarily positioned to accomplish its intended use. There remains a need for a device which is useful for preventing kinking at the supply end of a garden hose, and which may be removably or permanently installed directly at the supply end without sliding the device over the entire length of a hose. Further, the device should be able to be manually rotated (twisted) to apply torque to the hose coupling fixture for attachment and release from a threaded spigot or similar water supply fixture.

SUMMARY OF THE INVENTION

It is an object of this invention to provide a hand-held device which enables a user to apply torque to the female threaded coupling fixture at the terminal end of a hose to facilitate attachment to and/or removal of the hose from a mating male supply fixture.

It is another object of the invention to provide a device meeting the above objective which may be attached to the supply end of the hose without having to be threaded over the delivery end of the hose and advanced along the hose to the supply end of the hose prior to use.

Its is also an object of the invention to provide a device which may be used to attach and remove a sprinkler or other fluid delivery apparatus having a rotatable female coupling fixture on the supply end thereof from engagement with the threaded male fixture on a terminal delivery end of a hose.

It is still another object of this invention to provide a device having unitary construction which may be easily and inexpensively molded from a suitable material.

It is yet another object of the invention to provide a device meeting the above objectives which prevents kinking of a portion of a hose underlying and positioned within the device adjacent to the supply end of the hose.

The features of the invention believed to be novel are set forth with particularity in the appended claims. However the invention itself, both as to organization and method of operation, together with further objects and advantages thereof may be best be understood by reference to the following description taken in conjunction with the accompanying drawings in which:

DESCRIPTION OF THE PREFERRED EMBODIMENTS

Figure 1:
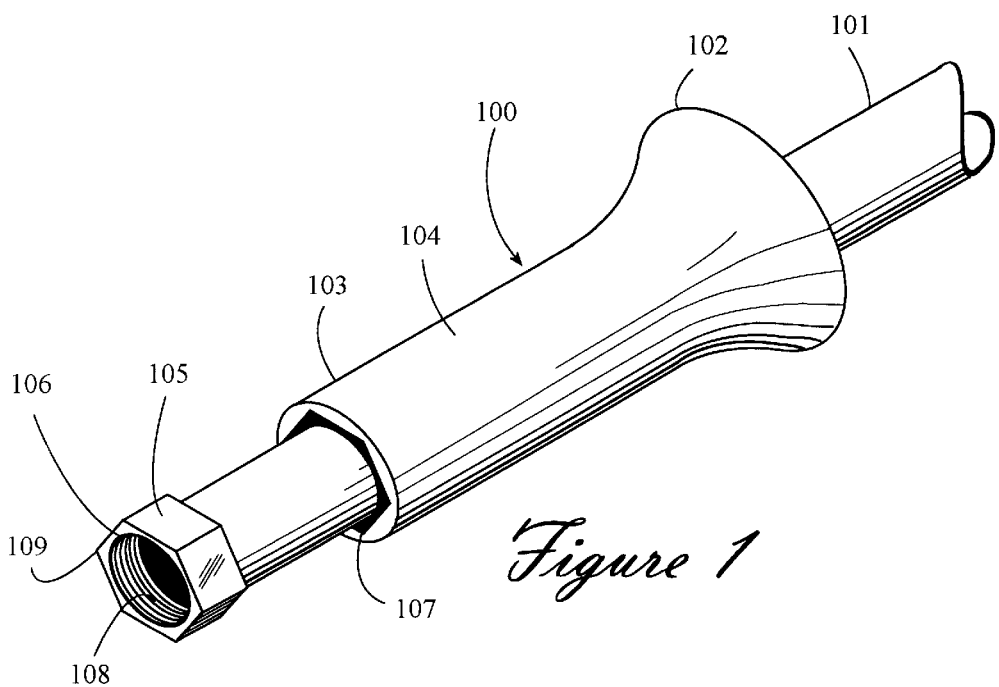
FIG. 1 is a perspective view of a first embodiment of a anti-kink sleeve and wrenching device in accordance with the present invention mounted on a garden hose near the supply end of a hose having a rotatable female threaded coupling fixture mounted thereon.

FIG. 1 shows one embodiment of the device 100 in accordance with the present invention. This embodiment of the device 100 is adapted to be slidingly and rotatably mounted over the outer surface of a hose 101. The device 100 has a distal end 102 which is flared to prevent kinking of the hose during use. The device 100 has a proximal end 103 having an inner surface dimensioned to matingly and non-rotatably engage the female coupling fixture 105 mounted at a supply end of said hose 101. A body portion 104 having an axial lumen 201 (FIG. 2) coextensive with the device 100 lies between the proximal end 103 and the distal end 102 of the device. The hose 101 has a supply end having a rotating female threaded coupling fixture 105 mounted thereon. The coupling fixture 105 has a washer 106 therewithin and a threaded interior surface 108 and leading edge 109. The device 100 has an interior surface 107 at the proximal end 103. Said interior surface 107 is dimensioned to non-rotatably and matingly engage the exterior surface of the coupling fixture 105 by means of a hexagonal cross-section sized to fit over the hexagonal fitting of the hose. The device 100 may be installed on the hose by being slid over the delivery terminus of the hose 101 (not shown) or the supply terminus 105.

Figure 2:
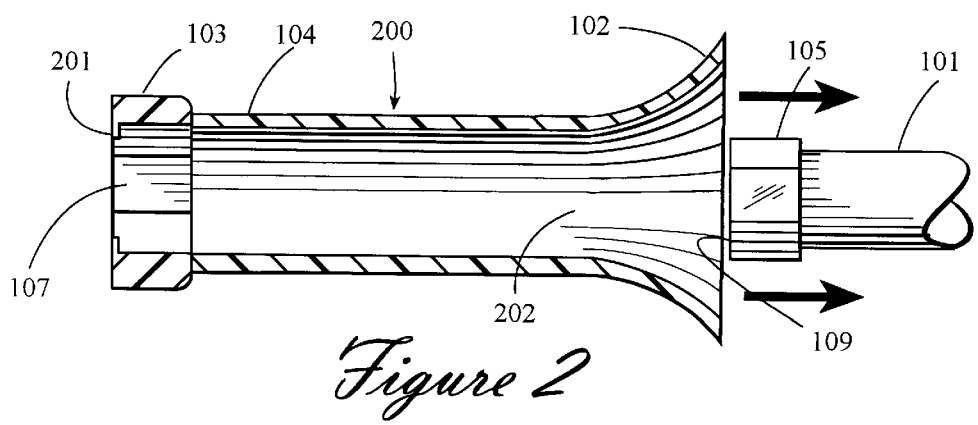
FIG. 2 is a longitudinal cross-section of the first embodiment of the present invention shown in FIG. 1 showing a mode for introducing the device directly onto the supply terminus garden hose.

Another preferred embodiment of the device 200 is shown in FIG. 2. The device 200 is similar to the device shown in FIG. 1 except that one or more protuberances (or stop(s)) 201 on the inner surface 107 of the distal end 103 of the device 200 prevent the device 200 from sliding completely over and off the coupling fixture 105. That is, the device 200 is preferably slid over the fixture 105 then onto the hose 101. The distal end 102 of the device 200, which is flared, easily fits over the outer circumference of the coupling fixture 105 and may be pulled toward the delivery end (not shown) of the hose 101 until the stops 201 rest against the leading edge 109 of the coupling fixture 105. At this point, further advancement is not possible.

Figure 3:
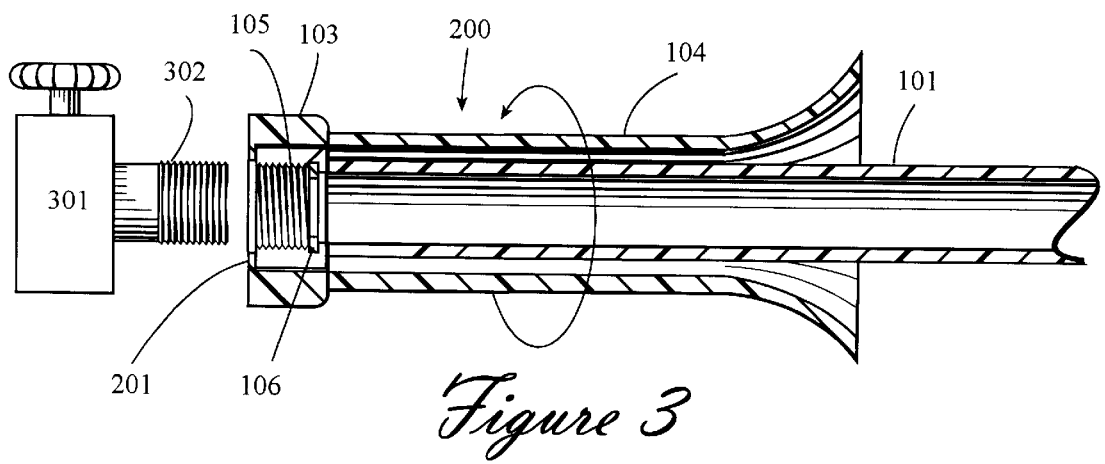
FIG. 3 is a cross-sectional view showing the first embodiment of the device shown in FIGS. 1 and 2 positioned for use on the supply end of a garden hose prior to attachment of the hose's female threaded coupling fixture to a water supply source.

FIG. 3 shoes the correct positioning of the device 200 over a hose 101 and coupling fixture 105. The device 200 overlies and matingly engages the outer surface of the coupling fixture 105. The body portion 104 may be manually grasped and twisted as shown by the arrow in a clockwise direction in order to torque the coupling fixture 105, independent of the hose 101, and advance the threaded coupling fixture 105 onto a male threaded source fixture 302 which is dimensioned to receive said coupling fixture 105, until the washer 106 within the coupling fixture 105 is compressed between therebetween to form a fluid-tight seal. The body portion 104 provides a comfortable and secure hand grip for twisting the device 200 and assisting in attachment of the hose 101 (and coupling fixture 105) to a supply source 301.

Figure 4:
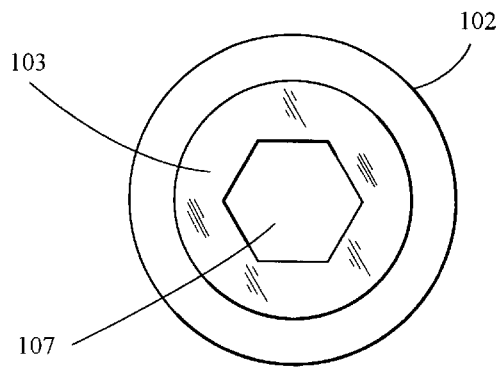
FIG. 4 is an end-on view of the device shown in FIG. 2 viewed from left to right.
Figure 5:
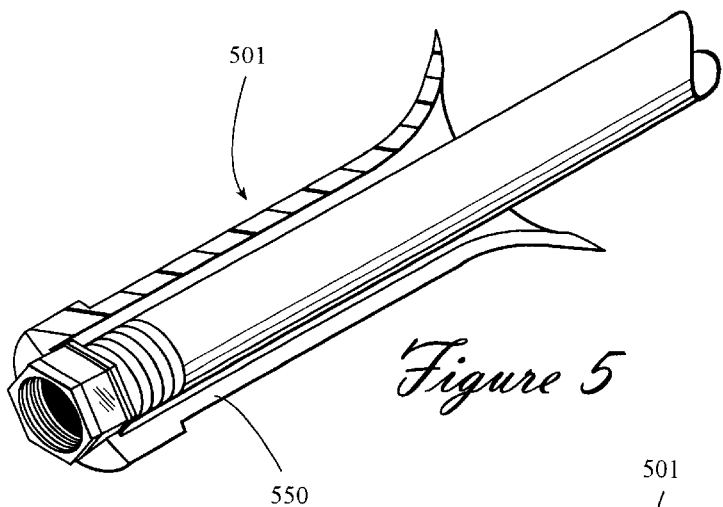
FIG. 5 shows a cross-sectional perspective view of a second embodiment of the device in position over a portion of supply end of the hose, the inner, fixture-contacting surface of the sleeve device being adapted to engage at least a portion of the outer surface of the coupling fixture. The elastically deformable sleeve has a slit extending the entire length thereof

FIG. 4 is an end-on view of the device shown in FIG. 1 or 2, viewed from left to right. The inner surface 107 of the proximal end of the devices 100 and 200 is dimensioned to matingly engage the outer surface of the coupling fixture 105. The flared distal ends of the devices 100 and 200 are preferably dimensioned to project outward so that the outer diameters 102 are greater than the outer diameter of both the body portions 104 and the proximal ends 103. The flares, in operation, rotate freely over the outer diameter of the hose 101, independent of the female coupling fixture 105, and allow the hose 101 to bend during use without kinking. In the present embodiment, the body portion 104 of the device is between 4 and 6 inches long, which enables the entire palm of the hand to be placed around the body portion to apply torque to the proximal end thereof FIG. 5 shows a cross-sectional view of yet another preferred embodiment of the invention. The device 500 is substantially similar in use and operation to the previously described embodiments with the exception that the proximal end 503 matingly engages only a portion of the coupling fixture 505. The inner surface 507 of the proximal end 503 is dimensioned, in this embodiment, to non-rotatingly engage a portion of a female coupling fixture 505.

Figure 6A:
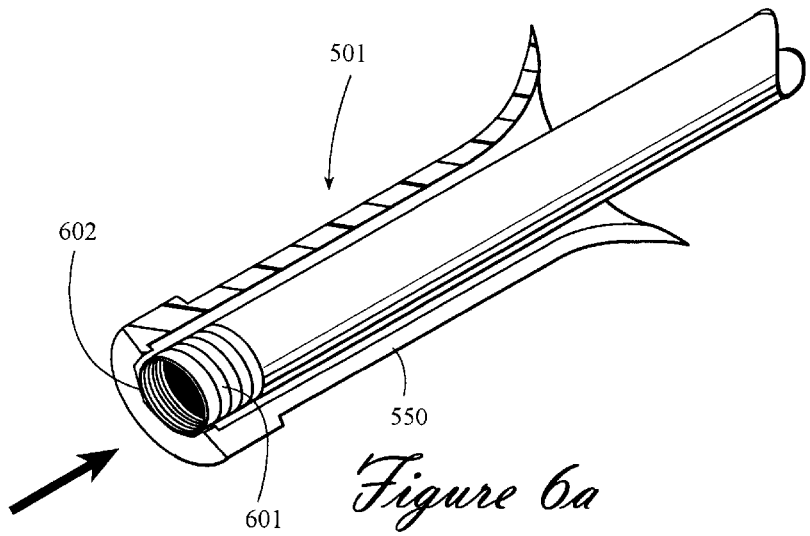
FIG. 6a is a perspective view of the second embodiment of the anti-kink sleeve and wrenching device of the present invention, installed on a garden hose at the delivery end carrying the male threaded coupling fixture wherein the wrench end of the device is positioned to matingly engage a threaded female coupling.
Figure 6B:
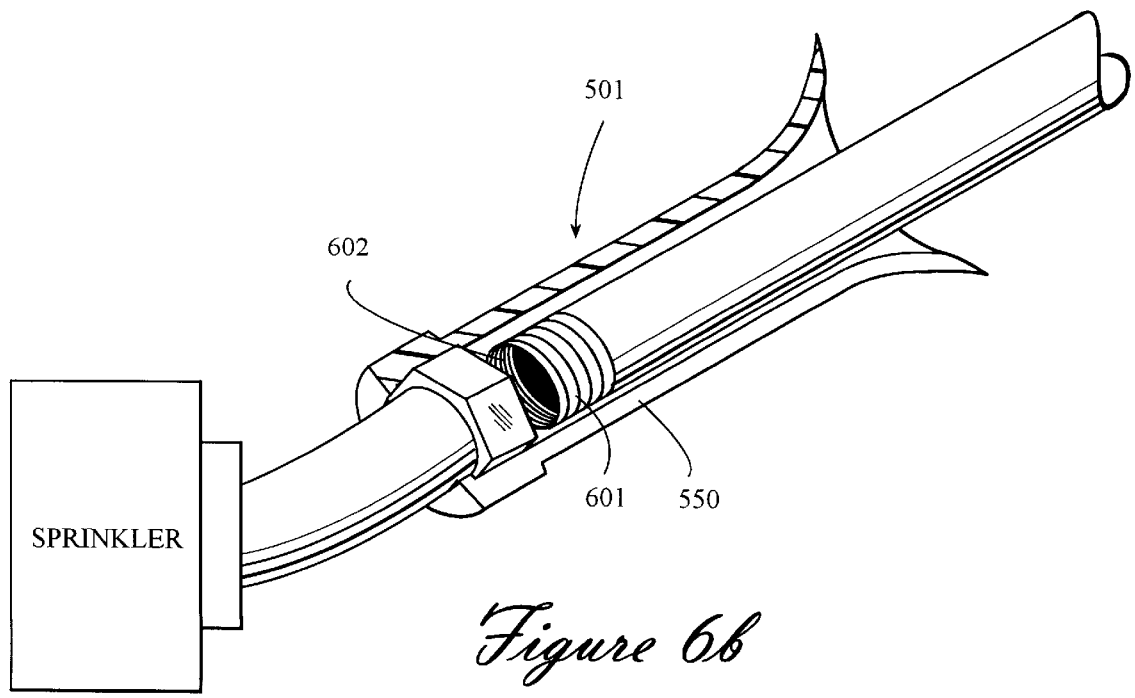
FIG. 6b shows the device of FIG. 6a employed to attach a female connector on a sprinkler to the male connector on the water output terminus of a hose.
Figure 7:
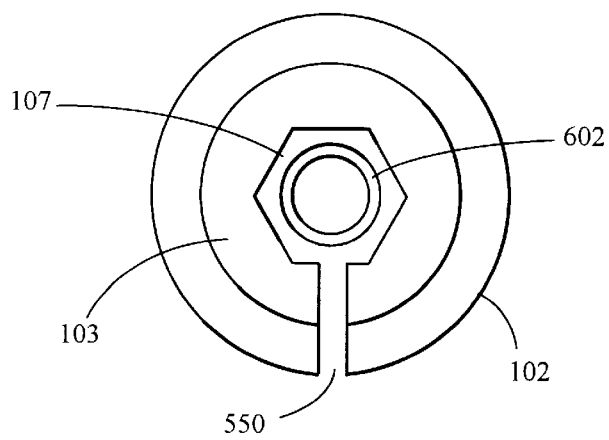
FIG. 7 is an end-on view of the device of FIGS. 6a and 6b viewed in the direction of the broad arrow.

FIG. 6a shows the device of FIG. 5 in position over a portion of the male coupling fixture 601 and the delivery end of a hose 602. The device 501 is of unitary construction and is installed and removed from a hose assembly by means of a slit 550 in the wall thereof. The device 501 is constructed of an elastically deformable material so that a user opens the slit 550 slipping a length of the hose assembly therethrough, thereby positioning the device over a portion of fixture coupling 601 for complete installation and easy removal. The device may include means for either permanent or releasable closure of the slit 550. This embodiment is also useful for assisting in the attachment to or removal of a sprinkler (or other apparatus bearing a female coupling fixture) from a hose assembly at a terminus having a male threaded fixture mounted thereon, as shown in FIG. 6b. The device in operation non-rotatably attaches to a female coupling fixture 602 on an accessory apparatus such as a sprinkler with the body portion slidingly and rotatably overlying the mating male fixture of a hose assembly so that the accessory may be either attached to or removed from the delivery end of a hose bearing the male coupling.

The embodiment of the device shown in FIG. 6 is useful for engaging rotatable female couplings even when the coupling is on a separate device. For example, when the male threaded delivery end of a garden hose is matingly engaged to a sprinkling device, often it is very difficult to manually rotate the female coupling fixture attached to the sprinkler to either remove (or, alternatively, to attach) the hose. The difficulty arises principally due to the limited access to the female coupling resulting from the sprinkler design. A tight connection in combination with generally wet conditions and a relatively small female coupling grip surface results in difficulty getting a firm grip on the coupling. Thus, the device of the present invention may be utilized to facilitate attachment by positioning the device over the male threaded end of a hose and gripping the female threaded coupling fixture of a sprinkler or other apparatus with the matingly engaging proximal end of the device and twisting to easily and comfortably attach or remove the sprinkler. Further, this embodiment accommodates varying grip strengths while still maintaining its position at the female threaded coupling fixture.

While particular embodiments of the present invention have been illustrated and described, it would be obvious to those skilled in the art that various other changes and modifications can be made without departing from the spirit and scope of the invention. For example, the distal end of the devices are not required to be flared in all embodiments. Further, some embodiments of the device can be installed by sliding said device over either terminus end (supply or delivery) of the hose assembly, whichever is most convenient. As a further example, all embodiments may be of unitary construction, or not. It is, therefore, intended to cover in the appended claims all such changes and modifications that are within the scope of this invention.

What we claim is:

1. A device adapted for use with a hose assembly having a proximal end, a distal end and a hollow hose portion therebetween, the hollow hose portion having an inner surface and an outer surface, the hose assembly further including a rotatable female threaded coupling fixture mounted on at least one terminal end thereof, the rotatable female threaded coupling fixture having an inner surface, an outer surface arid a central lumen, the inner surface of the female threaded coupling fixture being adapted to matingly engage the outer surface of a male threaded fixture, the device being of unitary construction and comprising a sleeve having an inner surface, an outer surface, a proximal end and a distal end, and a hollow body portion therebetween, the hollow body portion and the distal end of the device having an inner surface diameter greater than the outer surface of the hollow hose portion, the body portion and the distal end of the device being dimensioned to rotate freely over the outer surface of the hollow hose portion of the hose assembly, the proximal end of the device being adapted for non-rotating engagement to at least a portion of the exterior surface of the female coupling fixture and includes a stopping means engagable with a radial end face of the female fixture and operable for preventing the proximal end of the device from sliding off the female coupling fixture in a distal direction, the body portion of the device providing grasping means for applying torque to and rotating the female coupling fixture independent of the hollow hose portion of the hose assembly.

2. The device of claim 1 wherein the body portion of the sleeve is flared.

3. The device of claim 1 wherein the device is adapted for use with an accessory apparatus and hose assembly, wherein the accessory apparatus has at least one rotatable female coupling fixture and the hose assembly has at least one threaded, non-rotatable male fixture.

4. The device of claim 1 wherein said sleeve further includes a slit therethrough extending from said proximal end to said distal end thereof.

5. The device of claim 2 wherein said sleeve further includes a slit therethrough extending from said proximal end to said distal end thereof.

6. A device adapted for use with a hose assembly, said hose assembly having a proximal end, a distal end and a hollow hose portion therebetween, the hollow hose portion having an inner surface and an outer surface and at least one rotatable female threaded coupling fixture mounted on at least one terminal end thereof, the rotatable female threaded coupling fixture having an inner surface, an outer surface and a central lumen, the inner surface of the female threaded coupling fixture being adapted to matingly engage the outer surface of a male threaded fixture, the device being of unitary construction and comprising a sleeve having an inner surface, an outer surface, a proximal end and a distal end, and a hollow body portion therebetween, the device having a slit therethrough from said proximal end to said distal end thereof, the hollow body portion and the distal end of the device having an inner surface diameter greater than the outer surface of the hollow hose portion of the hose assembly, the body portion and the distal end of the device being dimensioned to rotate freely over the outer surface of the hollow hose portion of the hose assembly, the proximal end of the device being adapted for non-rotating engagement to at least a portion of the exterior surface of the female coupling fixture, the body position of the device providing grasping means for applying torque to and rotating the female coupling fixture independent of the hollow hose portion of the hose assembly.

7. The device of claim 6 wherein said proximal end includes a stopping means operable for preventing said proximal end from sliding off the female coupling fixture in a distal direction.

8. The device of claim 6 wherein said body portion of the sleeve is flared.

9. The device of claim 7 wherein said body portion of the sleeve is flared.

10. The device of claim 6 wherein the device is adapted for use with an accessory apparatus and hose assembly, wherein the apparatus has at least one rotatable female coupling fixture and the hose assembly has a threaded, non-rotatable male fixture.

11. The device of claim 7 wherein the device is adapted for use with an accessory apparatus and hose assembly, wherein the apparatus has at least one rotatable female coupling fixture and the hose assembly has a threaded, non-rotatable male fixture.

12. The device of claim 8 wherein the device is adapted for use with an accessory apparatus and hose assembly, wherein the apparatus has at least one rotatable female coupling fixture and the hose assembly has a threaded, non-rotatable male fixture.

13. The device of claim 9 wherein the device is adapted for use with an accessory apparatus and hose assembly, wherein the apparatus has at least one rotatable female coupling fixture and the hose assembly has a threaded, non-rotatable male fixture.

* * * * *